US012802037B2

(12) United States Patent
Mortimer

(10) Patent No.: US 12,802,037 B2
(45) Date of Patent: Nov. 17, 2026

(54) OPERATION MODIFICATION TO ADDRESS INCOMPATIBILITY VIA MACHINE LEARNING

(71) Applicant: ADP, Inc., Roseland, NJ (US)

(72) Inventor: Kelly Marie Mortimer, Greenlawn, NY (US)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/760,572

(22) Filed: Jul. 1, 2024

(65) Prior Publication Data

US 2025/0021939 A1 Jan. 16, 2025

Related U.S. Application Data

(60) Provisional application No. 63/565,380, filed on Mar. 14, 2024, provisional application No. 63/513,292, filed on Jul. 12, 2023.

(51) Int. Cl.

*G06Q 10/1057* (2023.01)
*G06F 40/186* (2020.01)
*G06Q 10/0637* (2023.01)

(52) U.S. Cl.

CPC ....... *G06Q 10/1057* (2013.01); *G06F 40/186* (2020.01); *G06Q 10/06375* (2013.01)

(58) Field of Classification Search

CPC .......... G06Q 10/1057; G06Q 10/06375; G06F 40/186
USPC .......................................................... 705/322
See application file for complete search history.

(56) References Cited

U.S. PATENT DOCUMENTS 7,315,867 B2 1/2008 Kobayashi et al.
7,640,185 B1 * 12/2009 Giordano ............. G07G 1/0036 705/1.1
11,170,249 B2 11/2021 Semenov
2008/0155249 A1 * 6/2008 Backof ................ H04B 1/0003 455/73

(Continued)

FOREIGN PATENT DOCUMENTS

EP 3798956 A1 3/2021
WO WO-9912109 A1 * 3/1999 ............. G06Q 30/02

OTHER PUBLICATIONS

International Search Report issued in corresponding International Application No. PCT/US2024/036420, dated Sep. 18, 2024 (13 pages).

(Continued)

*Primary Examiner* — Ilana L Spar
(74) *Attorney, Agent, or Firm* — Foley & Lardner LLP

(57) ABSTRACT

Controlling operation compatibility via machine learning is provided. A system with one or more processors, coupled with memory, detects, via natural language processing, an update to an operational constraint established in an electronic document. The system receives data corresponding to operations executed by an entity. The system determines, via a model trained with machine learning on historical operational data for the entity, an incompatibility between an operation of the entity and the update to the operational constraint. The system selects, responsive to determination of the incompatibility, an action to address the incompatibility. The system executes the action to modify the operation of the entity to satisfy the update to the operational constraint.

20 Claims, 7 Drawing Sheets

(56) References Cited

U.S. PATENT DOCUMENTS

| | | | | |
|---|---|---|---|---|
| 2012/0331131 | A1* | 12/2012 | Milden | G06Q 10/0633 709/224 |
| 2016/0307067 | A1 | 10/2016 | Filimonova | |
| 2018/0373711 | A1 | 12/2018 | Ghatage et al. | |
| 2020/0175110 | A1* | 6/2020 | Snyder | G06Q 10/10 |
| 2020/0219111 | A1 | 7/2020 | Nair et al. | |
| 2021/0097274 | A1 | 4/2021 | Gligan et al. | |
| 2021/0150338 | A1 | 5/2021 | Semenov | |
| 2021/0312360 | A1* | 10/2021 | Kim | G06Q 30/018 |
| 2022/0139098 | A1 | 5/2022 | Semenov | |
| 2022/0237373 | A1 | 7/2022 | Singh Bawa et al. | |
| 2023/0028992 | A1 | 1/2023 | Zagaynov et al. | |
| 2023/0067069 | A1 | 3/2023 | Ghatage et al. | |
| 2025/0028734 | A1 | 1/2025 | Balasubramaniyan et al. | |

OTHER PUBLICATIONS

Abbyy University: "ABBYY FlexiCapture Tutorial: NLP Models for Repeatable Items", (Feb. 7, 2022), XP093202628, https://www.youtube.com/watch?v=WO5zWtvILbc&list=PLiF4rjGylo5_HI-oevl4EOmYMRbZ8IMhg&index=2.

Dmacks: "Ensemble learning", Jun. 16, 2023 (Jun. 16, 2023), pp. 1-15, XP093217063, Retrieved from the Internet: URL:https://en.wikipedia.org/w/index.php?title=Ensemble_learning&oldid=1160388140.

International Preliminary Report on Patentability and Written Opinion in corresponding International Application No. PCT/US2024/036420, dated Jan. 22, 2026 (7 pages).

International Preliminary Report on Patentability and Written Opinion in corresponding International Application No. PCT/US2024/038366, dated Jan. 29, 2026 (12 pages).

International Preliminary Report on Patentability and Written Opinion in corresponding International Application No. PCT/US2024/038370, dated Jan. 29, 2026 (11 pages).

International Search Report and Written Opinion issued in corresponding International Application No. PCT/US2024/038366, dated Nov. 15, 2024 (21 pages).

International Search Report issued in corresponding International Application No. PCT/US2024/038370, dated Sep. 17, 2024 (19 pages).

Kuncheva Ludmila I: "Chapter 6: ensemble methods" In: "Combining Pattern Classifiers", (2014), Wiley, XP093202668, pp. 186-229.

Notice of Allowance on U.S. Appl. No. 18/355,198 dated Apr. 14, 2026 (9 pages).

NPL: Results Publication Date Range: Jul. 3, 2012 to Sep. 23, 2025.

NPL: Results Publication Date Range: Jul. 3, 2012 to Oct. 30, 2025.

Prescientdm: "Kofax Capture Document Management System Demos Prescient", published Dec. 6, 2010. https://www.youtube.com/watch?v=MHcaiTZqRxM&list=PL0lif83klv61VNfngSN9R4ErfeOyd4L40&index=2.

Sebastian Raschka, "Model Evaluation, Model Selection, and Algorithm Selection in Machine Learning", Retrieved from the Internet: URL:https://arxiv.org/pd?/1811.12808, Nov. 1, 2018, 49 pages.

Sundqvist Tobias et al: "Boosted Ensemble Learning for Anomaly Detection in 5G RAN" In: "Artificial Intelligence Applications and Innovations: 16th IFIP WG 12.5 International Conference, AIAI 2020, Neos Marmaras, Greece, Jun. 5-7, 2020, Proceedings, Part I", Jan. 1, 2020 (Jan. 1, 2020), Springer International Publishing, XP093217078, ISSN: 1868-4238, ISBN: 978-3-030-49161-1, vol. 583, pp. 15-30, DOI: 10.1007/978-3-030-49161-1_2, Retrieved from the Internet: URL:https://link.springer.com/.

US Non-Final Office Action issued in corresponding U.S. Appl. No. 18/355,198, dated Oct. 1, 2025 (8 pages).

US Notice of Allowance issued in corresponding U.S. Appl. No. 18/355,198, dated Dec. 4, 2025 (9 pages).

Webb et al., "To Ensemble or Not Ensemble: When does End-to-End Training Fail", Machine Learning and Knowledge Discovery in Databases : European Conference, ECML PKDD 2020, Sep. 14-18, 2020, Proceedings, Part III, Aug. 6, 2020 (Aug. 6, 2020), Springer International Publishing, XP093216728, vol. 12459, pp. 109-123, DOL: 10.1007/978-3-030-67664-37, Retrieved from the Internet: URL:https://arxiv.org/pd?/1902.04422>, 21 pages.

Windmill: "Kofax—Invoice Processing", (Jun. 12, 2014), XP093202623, https://www.youtube.com/watch?v=MHcaiTZqRxM&list=PLOlif83klv61VNfngSN9OR4ErfeOyd4L40&index=2.

* cited by examiner

OPERATION MODIFICATION TO ADDRESS INCOMPATIBILITY VIA MACHINE LEARNING

CROSS-REFERENCES TO RELATED APPLICATIONS

This application claims the benefit of priority under 35 U.S.C. § 119 to U.S. Provisional Patent Application No. 63/565,380, filed Mar. 14, 2024, and U.S. Provisional Patent Application No. 63/513,292, filed Jul. 12, 2023, each of which is hereby incorporated herein by reference in its entirety.

TECHNICAL FIELD

This application is generally related to computing technology, and particularly to addressing incompatibilities using a machine learning model.

BACKGROUND

In a computing environment that includes disparate or heterogenous components that are integrated or interfaced with one another to perform complex electronic transactions, it can be challenging to reliably and accurately perform an operation to execute the electronic transaction when a new event or constraint is triggered without introducing excessive error, delays, or latency within the operations performed by the computing environment.

SUMMARY

Aspects of the technical solutions described herein provide operation modifications to address incompatibilities via machine learning. For example, aspects of the technical solutions can control operation compatibility in a workflow using machine learning. Aspects of the technical solutions facilitate identifying, classifying, and extracting information from multiple data sources using machine learning to determine compliance with one or more policies. Some aspects of the technical solution include generating and displaying suggestions to ensure compliance on a graphical user interface.

An aspect of the technical solutions described herein can relate to a system to control operation compatibility via machine learning. The system includes a data processing system comprising one or more processors, coupled with memory. The one or more processors can be configured to: detect, via natural language processing, an update to an operational constraint established in an electronic document, receive, from an electronic processing system, data corresponding to operations executed by an entity, determine, via a model trained with machine learning on historical operational data for the entity, an incompatibility between an operation of the entity and the update to the operational constraint, select, responsive to determination of the incompatibility, an action to address the incompatibility, and execute the action to modify the operation of the entity to satisfy the update to the operational constraint. The historical operational data for the entity can include data for any time period, including data from the last 24 hours, 48 hours, 72 hours, 1 week, 2 weeks, 30 days, 60 days, 90 days, 180 days, or other duration. In some cases, the historical operational data can be updated in real-time as new data is received, detected, measured, or otherwise identified.

An aspect of the technical solutions described herein can relate to a method for controlling operation compatibility via machine learning. The method includes detecting, via natural language processing, an update to an operational constraint established in an electronic document, receiving, from an electronic processing system, data corresponding to operations executed by an entity, determining, via a model trained with machine learning on historical operational data for the entity, an incompatibility between an operation of the entity and the update to the operational constraint, selecting, responsive to determination of the incompatibility, an action to address the incompatibility, and executing the action to modify the operation of the entity to satisfy the update to the operational constraint.

An aspect of the technical solutions described herein can relate to a computer program product for controlling operation compatibility via machine learning, The computer program product includes a non-transitory computer readable storage medium having program instructions embodied therewith. The program instructions executable by a device to cause the device to detect, via natural language processing, an update to an operational constraint established in an electronic document, receive, from an electronic processing system, data corresponding to operations executed by an entity, determine, via a model trained with machine learning on historical operational data for the entity, an incompatibility between an operation of the entity and the update to the operational constraint, select, responsive to determination of the incompatibility, an action to address the incompatibility, and execute the action to modify the operation of the entity to satisfy the update to the operational constraint.

The described features of the subject matter of the present disclosure can be combined in any suitable manner in one or more embodiments and/or implementations. In this regard, one or more features of an aspect of the invention can be combined with one or more features of a different aspect of the invention. Moreover, additional features can be recognized in certain embodiments and/or implementations that can not be present in all embodiments or implementations.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
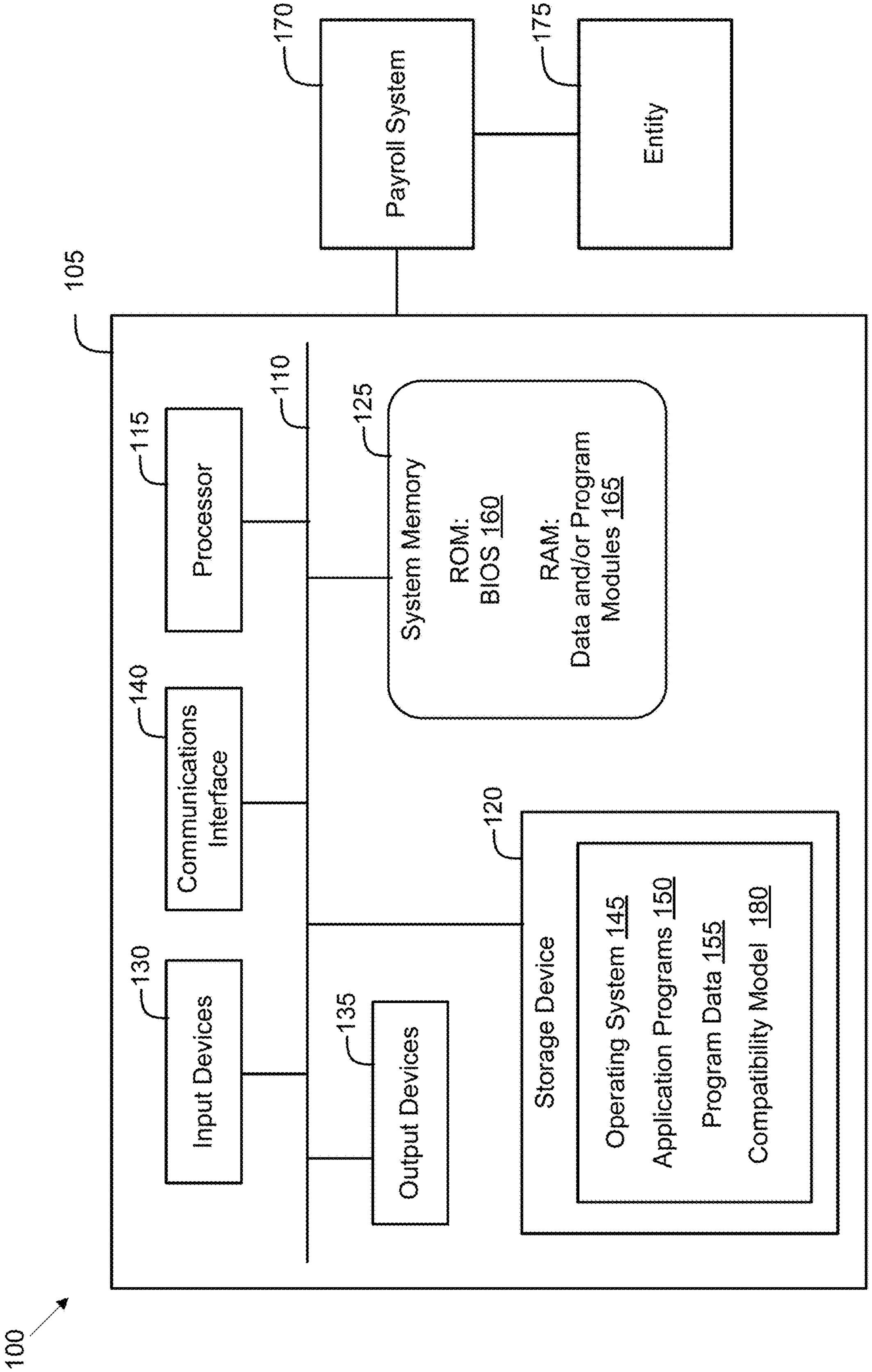
FIG. 1 is a block diagram of a compliance computing system implementing global embedded compliance within an entity's operations, according to some embodiments of the present disclose.

Aspects of the technical solutions described herein can provide for more accurately determining the location of a computing device. Technical solutions described herein can relate generally to a system for embedding compliance guidance in operations for an entity and, for example, to systems and methods for evaluating regulatory laws and embedding compliance guidance within a user interface for an entity. In a computing environment that includes disparate or heterogenous components that are integrated or interfaced with one another to perform complex electronic transactions, it can be challenging to reliably and accurately perform an operation to execute the electronic transaction based on the updated operational constraints without introducing excessive error, delays, or latency within the operations performed by the computing environment. Therefore, systems and methods for automatically monitoring and evaluating, using machine learning, the third party resources to determine any updates to operational constraints and automatically updating the performance of operations to execute an electronic transactions in a computing environment can be desired. Particularly, the systems and methods described herein can utilize generative artificial intelligence techniques to automatically evaluate compliance with various regulatory laws as described in more detail below with respect to FIG. 7.

An entity's operations can refer to a standard process or actions implemented by an entity. For example, an entity can implement a payroll operation in which the entity determines payroll information for one or more employees of the entity and facilitates paying any employees associated with the entity in compliance with any relevant rules and regulations. Payroll information can include, but is not limited to the location of the employee, a pay type (e.g., salary, hourly, contract, etc.) and pay amount for the employee, a start date for the employee, an end date for the employee, an employee type, a time status (e.g., full-time, part-time, etc.) of the employee, and any employee policies (e.g., paid family leave, sick leave, tax exempt status, etc.) which can be associated with the employee. As another example, an entity can implement a tax operation in which the entity facilitates the paying of taxes for the entity and any employees associated with the entity in compliance with any relevant rules and regulations. As another example, an entity can implement a retirement contribution operation which facilitates retirement contributions by employees associated with the entity in compliance with any relevant rules and regulations. As another example, an entity can implement a scheduling operation which facilitates generating a schedule for employees of the entity in compliance with any relevant rules and regulations.

An entity's operation can include a front end system, such as a graphical user interface displayed on a computing device, which can be configured to display information about the entity's operations to a user and receive any inputs from the user to update or change the entity's operations. For example, a payroll operation can display the payroll information on a graphical user interface. A user can provide inputs to update the payroll information through the user interface. Examples of user interfaces which can be displayed on the front-end system are described in more detail below with respect to FIGS. 4-6. The user interface can display a point of entry notification which determines and displays any changes or actions a user can take to be in compliance with any updated operational constraints as outlined within an electronic document which describes statutory updates. The point of entry notification is described in more detail in FIG. 5.

Aspects of the technical solutions disclosed herein can implement an automated process for ensuring an entity is operating in compliance with any relevant statutory regulations. For example, aspects of the technical solutions can receive legislative data from one or more governmental resources, determine any changes which can impact an operation of an entity based on the received legislative data, and automatically update an operation for an entity based on the determined changes. The technical solutions can be automated, thereby reducing human error which leads to decreased legal exposure and unnecessary fines.

It should be understood that, to the extent implementations of the invention collect, store, or employ personal information provided by, or obtained from, organizations, such information shall be used in accordance with all applicable laws concerning protection of personal information. Additionally, the collection, storage, and use of such information can be subject to consent of the individual or corporation to such activity, for example, through "opt-in" or "opt-out" processes as can be appropriate for the situation and type of information. Storage and use of personal information can be anonymized and stored in an appropriately secure manner reflective of the type of information, for example, through various encryption and anonymization techniques for particularly sensitive information.

Implementations of the present disclosure can be a computer system, a computer-implemented method, and/or a computer program product. The computer program product is not a transitory signal per se, and can include a computer readable storage medium (or media) having computer readable program instructions thereon for causing a processor to carry out aspects of the present disclosure. As described herein, the computer readable storage medium (or media) is a tangible storage medium (or media). It should also be understood by those of skill in the art that the terms media and medium are used interchangeable for both a plural and singular instance.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
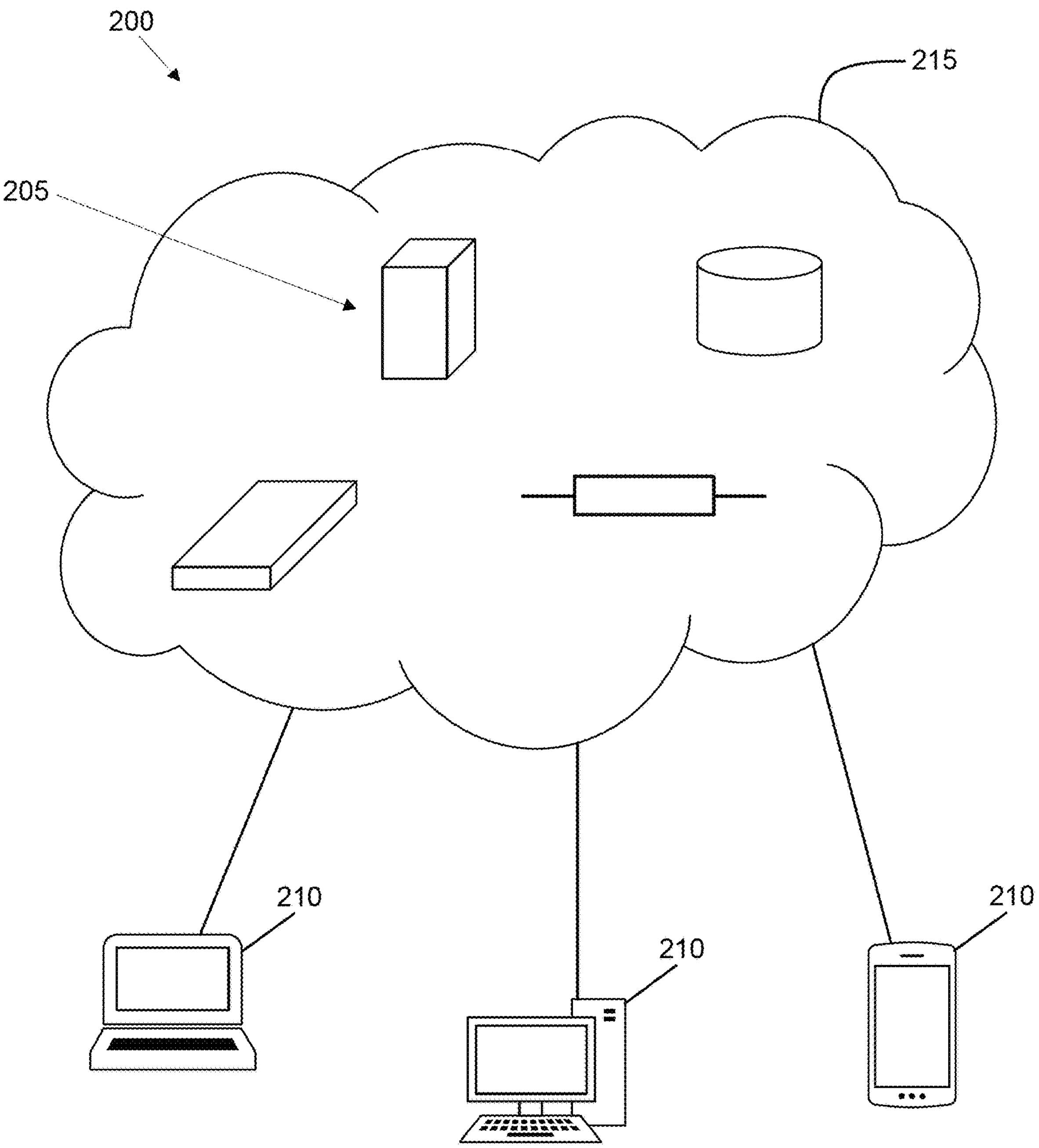
FIG. 2 is an exemplary cloud computing environment, according to some embodiments of the present disclosure.

As shown in FIG. 1, computing system 100 includes a computing device 105. The computing device 105 can be resident on a network infrastructure such as within a cloud environment as shown in FIG. 2, or can be a separate independent computing device (e.g., a computing device of a third party service provider). The computing device 105 can include a bus 110, a processor 115, a storage device 120, a system memory (hardware device) 125, one or more input devices 130, one or more output devices 135, and a communication interface 140. The computing system 100 can include an electronic processing system (e.g., payroll system 170) which can be communicably coupled to the computing device 105. The payroll system 170 can include storage devices which store payroll information and employment information for an entity 175. The payroll information can include, but is not limited to, a number of employees, salary of employees, working schedule of the employees, tax information, etc. The entity 175 can be any type of employer.

The bus 110 permits communication among the components of computing device 105. For example, bus 110 can be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 can be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which can be operatively implemented by the computer readable program instructions.

For example, after an opt-in process, processor 115 enables the computing device 105 to implement an automated process for ensuring the entity 175 is operating in compliance with any relevant statutory regulations. The processor 115 can allow the computing device 105 to receive legislative data from one or more governmental resources. For example, the computing device. For example, the computing device 105 can include a software application (e.g., a web crawler) which can be executed by the processors 115 to use one or more web scraping techniques to identify and extract updated legal data (e.g., statutory updates) from a variety of different websites (e.g., governmental websites, news websites, etc.). The one or more web scrapping techniques can include, but are not limited to, text pattern matching, HTTP programming, HTML parsing, Document Object Model (DOM) parsing, etc. The processor 115 can then enable the computing device 105 to evaluate the updated legal data, using machine learning techniques, to determine any changes which can impact an operation of the entity 175. For example, the computing device 105 can determine, based on the updated legal data, that a minimum wage implemented by the entity 175 is below the legal limit set by new law as described in the updated legal data. In this case, the computing device 105 can update an operation for the entity 175 to bring the minimum wage implemented by the entity at or above the legal limit. The computing device 105 can update the operation for the entity by automatically implementing an action within the entity 175 to ensure compliance with the updated laws or policies. For example, the computing device 105 can work with the backend payroll system 170 to automatically implement a salary at or above the legal minimum wage after determining an update to the minimum wage. In other embodiments, the computing device 105 can update the operation for the entity 175 by providing a point of entry notification to a user through a user interface. The point of entry notification can summarize the legal conflict between the current operation the entity 175 and what actions a user can take to overcome the legal conflict.

As mentioned above, the computing device 105 uses machine learning techniques to determine any changes made to any relevant statutory regulations which can impact the operation of the entity 175. Specifically, the processor 115 receives a large volume of text documents which detail relevant laws and policies which can impact the operation of the entity 175 (e.g., labor regulations, environmental regulations, etc.). The large volume of text documents can be identified and retrieved by the web crawler described above. The processor 115 can then use natural language processing techniques to evaluate the large volume of text documents to identify any updated operational constraints (e.g., statutory updates) which are relevant to the operations executed by the entity. Further, the processor 115 can then determine an incompatibility between the operation of the entity and the updated operational constraint using machine learning techniques. For example, the processor 115 can use the compatibility model 180 to determine this incompatibility between the operation of the entity and updated operational constraint.

The compatibility model 180 can include a combination of one or more machine learning models. For example, the compatibility model 180 can include machine learning algorithms, equations, calculations, or models trained to determine an outcome based on an input. The compatibility model 180 can include neural networks, decision-making models, linear regression models, random forests, classification models, reinforcement learning models, clustering models, neighbor models, decision trees, probabilistic models, classifier models, or other such models. For example, the compatibility model 180 can include natural language processing (e.g., support vector machine (SVM), Bag of Words, Counter vector, Word2Vec, k-nearest neighbors (KNN) classification, long short term memory (LSTM)), object detection and image identification models (e.g., mask region-based convolutional neural network (R-CNN), CNN, single-shot detector (SSD), deep learning CNN with Modified National Institute of Standards and Technology (MNIST), RNN based long short term memory (LSTM), Hidden Markov Models, You Only Look Once (YOLO), LayoutLM), classification ad clustering models (e.g., random forest, XGBoost, k-means clustering, DBScan, isolation forests, segmented regression, sum of subsets 0/1 Knapsack, Backtracking, Time series, transferable contextual bandit) or other models such as named entity recognition, Saccharomyces Genome Database (SGD), term frequency-inverse document frequency (TF-IDF), stochastic gradient descent, Naïve Bayes Classifier, cosine similarity, multi-layer perceptron, sentence transformer, date parser, conditional random field model, Bidirectional Encoder Representations from Transformers (BERT), Elmo, fastText, XLNet, SuperGLUE, SQUAD2.0, among others. It should be understood that this listing of machine learning models is exemplary and is not to be construed as exhaustive or limiting. The compatibility model 180 can be trained on a pre-processed set of payroll information. The pre-processed set of payroll information is continually updated and fed back into the compatibility model.

In embodiments, processor 115 can receive input signals from one or more input devices 130 and/or drive output signals through one or more output devices 135. The input devices 130 can include, for example, a keyboard, a mouse, touch sensitive user interface (UI), microphone, voice interface, or gestures, for example. The output devices 135 can include, for example, a display device, audio output, haptic, or printer, for example.

The storage device 120 can include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 can store operating system 145, application programs 150, and program data 155 in accordance with aspects of the present disclosure.

The system memory 125 can include one or more storage mediums, including for example, non-transitory media such as flash memory, permanent memory such as read-only memory ("ROM"), semi-permanent memory such as random access memory ("RAM"), any other suitable type of storage component, or any combination thereof. The input/output system 160 (BIOS) can include the basic routines that help to transfer information between the various other components of computing device 105, such as during start-up, can be stored in the ROM. Additionally, data and/or program modules 165, such as at least a portion of operating system 145, application programs 150, and/or program data 155, that are accessible to and/or presently being operated on by processor 115 can be contained in the RAM.

The storage device 120 can include the compatibility model 180 which, as described above, is a machine learning model configured to process the large volume of electronic text documents to determine any incompatibilities between the current operation of the entity 175 and any updates to operational constraints as described in updated laws or policies which are relevant to the operations executed by the entity 175.

The communication interface 140 can include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 can be connected to remote devices or systems via one or more local area networks (LAN) and/or one or more wide area networks (WAN) using communication interface 140.

As discussed herein, computing system 100 can be configured to track location of a user accessing an application on a mobile application over a network. In particular, computing device 105 can perform tasks (e.g., process, steps, methods and/or functionality) in response to processor 115 executing program instructions contained in a computer readable medium, such as system memory 125. The program instructions can be read into system memory 125 from another computer readable medium, such as data storage device 120, or from another device via the communication interface 140 or server within or outside of a cloud environment. In embodiments, an operator can interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry can be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

As discussed herein, computing system 100 can detect an update to an operational constraint established in an electronic document and determine any incompatibilities between the operation of the entity 175 and the update to the operational constraint. The computing system 100 utilizes machine learning to determine these incompatibilities. For example, computing device 105 can perform tasks (e.g., process, steps, methods and/or functionality) in response to processor 115 executing program instructions contained in a computer readable medium, such as system memory 125. The program instructions can be read into system memory 125 from another computer readable medium, such as data storage device 120, or from another device via the communication interface 140 or server within or outside of a cloud environment. In embodiments, an operator can interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry can be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

The computing system 100 can be configured to control operation compatibility via machine learning. The computing system 100 can include a data processing system which includes the one or more processors 115 and the system memory 125. The data processing system can be configured to detect, via natural language processing, an update to an operational constraint established in an electronic document, receive, from a payroll system, data corresponding to operations executed by an entity, determine, via a model trained with machine learning on historical operational data for the entity, an incompatibility between an operation of the entity and the update to the operational constraint, select, responsive to determination of the incompatibility, an action to address the incompatibility, and execute the action to modify the operation of the entity to satisfy the update to the operational constraint. The data processing system can be further configured to detect the update to the operational constraint using natural language processing, determine a time limit based on the detected update to the operational constraint, and provide an alert notification indicating the action and set the time limit based on the detected update to automatically execute the action if an override of the action is not received within the time limit. The historical operational data for the entity can include data for any time period, including data from the last 24 hours, 48 hours, 72 hours, 1 week, 2 weeks, 30 days, 60 days, 90 days, 180 days, or other duration. In some cases, the historical data can be updated in real-time as new data is received, detected, measured, or otherwise identified.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein can be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 can be on a single network or a distributed network. Cloud resources 205 can be distributed across multiple cloud computing systems and/or individual network enabled computing devices. Client devices 210 can comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 can include one or more computing system 100 of FIG. 1 that is specifically adapted to perform one or more of the functions and/or processes described herein.

Cloud computing environment 200 can be configured such that cloud resources 205 provide computing resources to client devices 210 through a variety of service models, such as Software as a Service (Saas), Platforms as a service (PaaS), Infrastructure as a Service (IaaS), and/or any other cloud service models. Cloud resources 205 can be configured, in some cases, to provide multiple service models to a client device 210. For example, cloud resources 205 can provide both SaaS and IaaS to a client device 210. Cloud resources 205 can be configured, in some cases, to provide different service models to different client devices 210. For example, cloud resources 205 can provide SaaS to a first client device 210 and PaaS to a second client device 210.

Cloud computing environment 200 can be configured such that cloud resources 205 provide computing resources to client devices 210 through a variety of deployment models, such as public, private, community, hybrid, and/or any other cloud deployment model. Cloud resources 205 can be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein can be accessed and/or utilized by a client (e.g., an enterprise or an end user) as one or more of a SaaS, PaaS and laaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 can be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device. In other embodiments, a web browser-based portal can be used to provide the UI. Any other configuration to access cloud resources 205 can also be used in various implementations.

Figure 3:
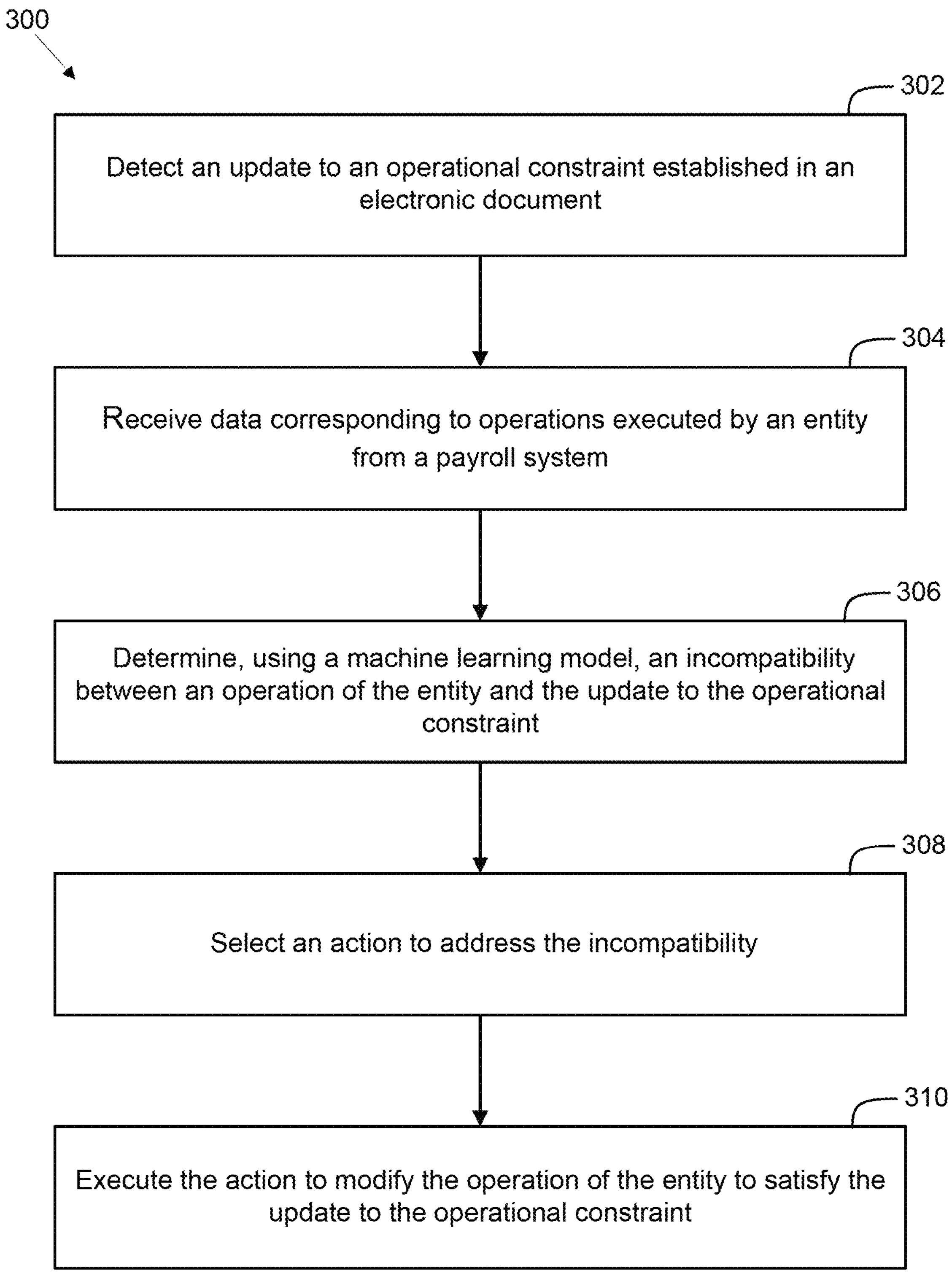
FIG. 3 is an example flowchart outlining operations of a process for implementing global embedded compliance within an entity's operations, according to some embodiments of the present disclosure.

FIG. 3 shows an example flowchart outlining operations of a process 300 for outlining operations of a process for implementing global embedded compliance within an entity's operations, according to some embodiments of the present disclose. The exemplary flows can be illustrative of a system, a method, and/or a computer program product and related functionality implemented on the computing system of FIG. 1, in accordance with aspects of the present disclosure. The computer program product can include computer readable program instructions stored on computer readable storage medium (or media). The computer readable storage medium can include the one or more storage medium as described with regard to FIG. 1, e.g., non-transitory media, a tangible device, etc. The method, and/or computer program product implementing the process 300 can be downloaded to respective computing/processing devices, e.g., computing system of FIG. 1 as already described herein, or implemented on a cloud infrastructure as described in FIG. 2. Accordingly, the processes 300 of the present disclosure can be implemented by special purpose hardware-based systems that perform the specified functions or acts or carry out combinations of special purpose hardware and computer instructions.

The process 300 can be implemented by the computing system 100 which can be operating within the cloud computing environment 200. For example, at step 302, the computing device 105 can detect an updated to an operational constraint established in an electronic document using the compatibility model 180. As described above, the computing device 105 can include a web crawler which can be executed by the processors 115 to identify and extract updated statutory regulations from a variety of different websites (e.g., governmental websites, news websites, etc.). The updated statutory regulations can be stored in an electronic document such as a text file.

The electronic document can then be evaluated using machine learning (e.g., natural language processing techniques such as sentiment analysis, named entity recognition, summarization, topic modeling, text classification, keyword extraction, lemmatization and stemming, etc.) to identify any statutory updates which are relevant to the operation of the entity 175. Specifically, the compatibility model 180 can be configured to receive statutory updates as an input and determine areas in which the entity 175 can be impacted based on attributes of the entity 175 and/or attributes or characteristics of the employees of the entity 175. For example, the compatibility model 180 can receive a statutory update from a certain jurisdiction (e.g., a state, territory, county, or city) regarding paid family or medical leave. The compatibility model 180 can determine that the entity has a certain number of employees within that certain jurisdiction. Therefore, the compatibility model 180 can determine that the statutory update regarding paid family or medical leave is relevant to the entity 175 and can leverage metadata points to determine and implement any applicable changes to bring the entity in compliance with the statutory update.

Figure 4:
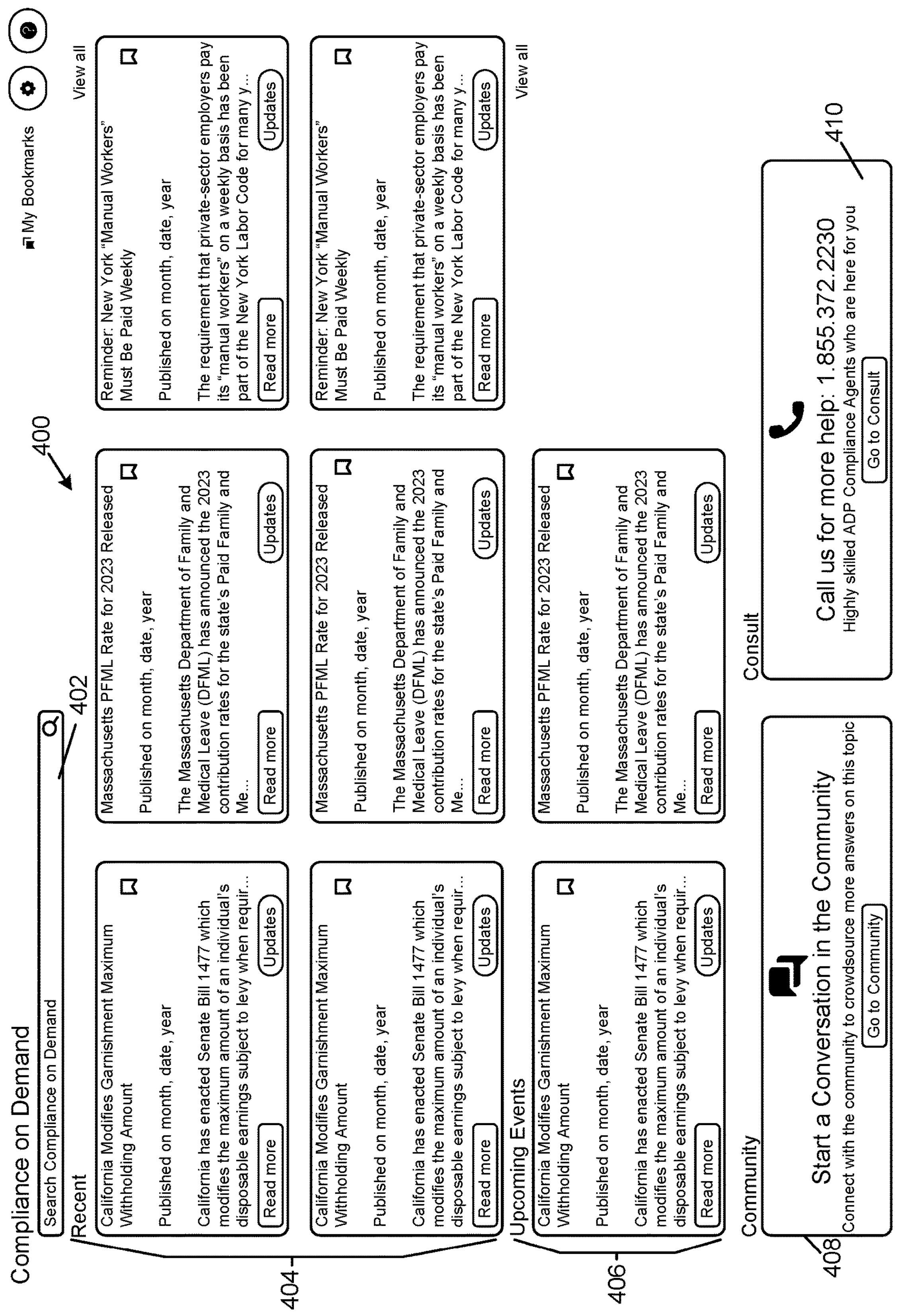
FIGS. 4-6 show various user interfaces and underlying functionality in accordance with aspects of the present disclosure.

The statutory updates determined relevant to compliance module can be displayed on a user interface as shown in FIG. 4. Specifically, FIG. 4 shows a compliance on demand user interface 400 which displays details on one or more statutory updates which are relevant to the entity 175. Specifically, the user interface 400 depicts statutory updates 404 which were recently updated and statutory updates 406 which are slated to be implemented in the future.

Figure 5:
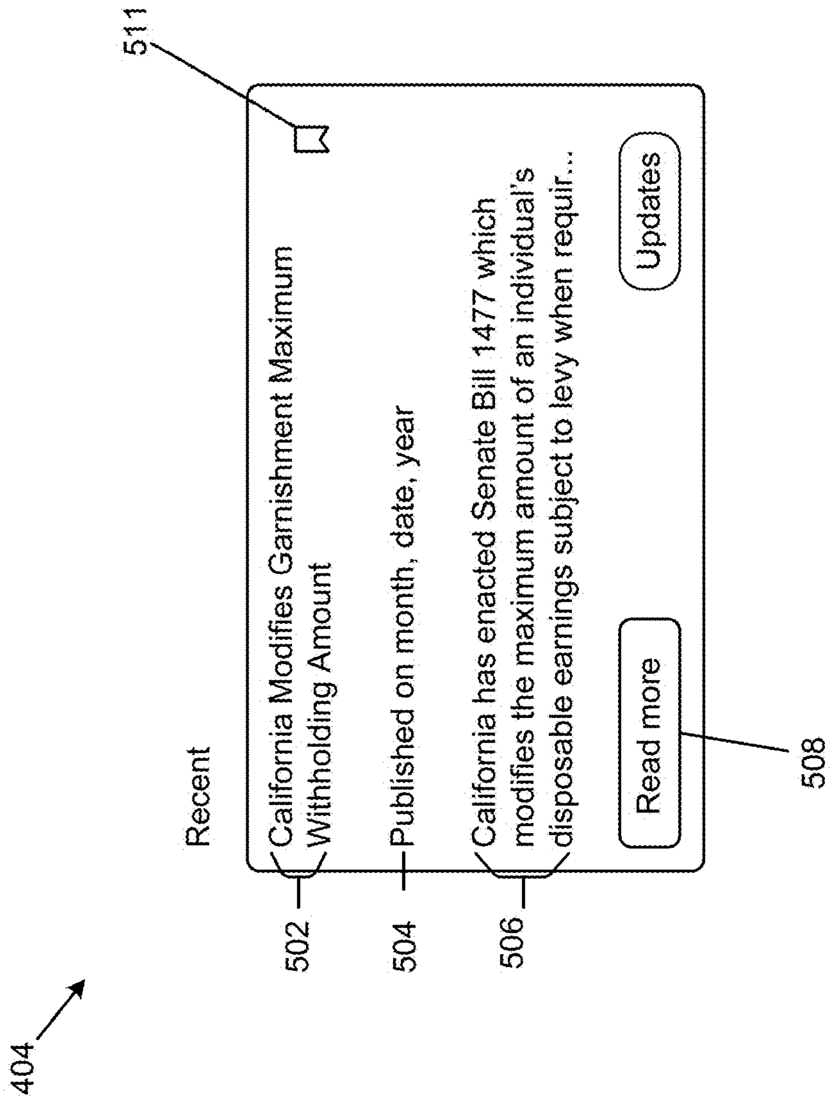
Figure 6:
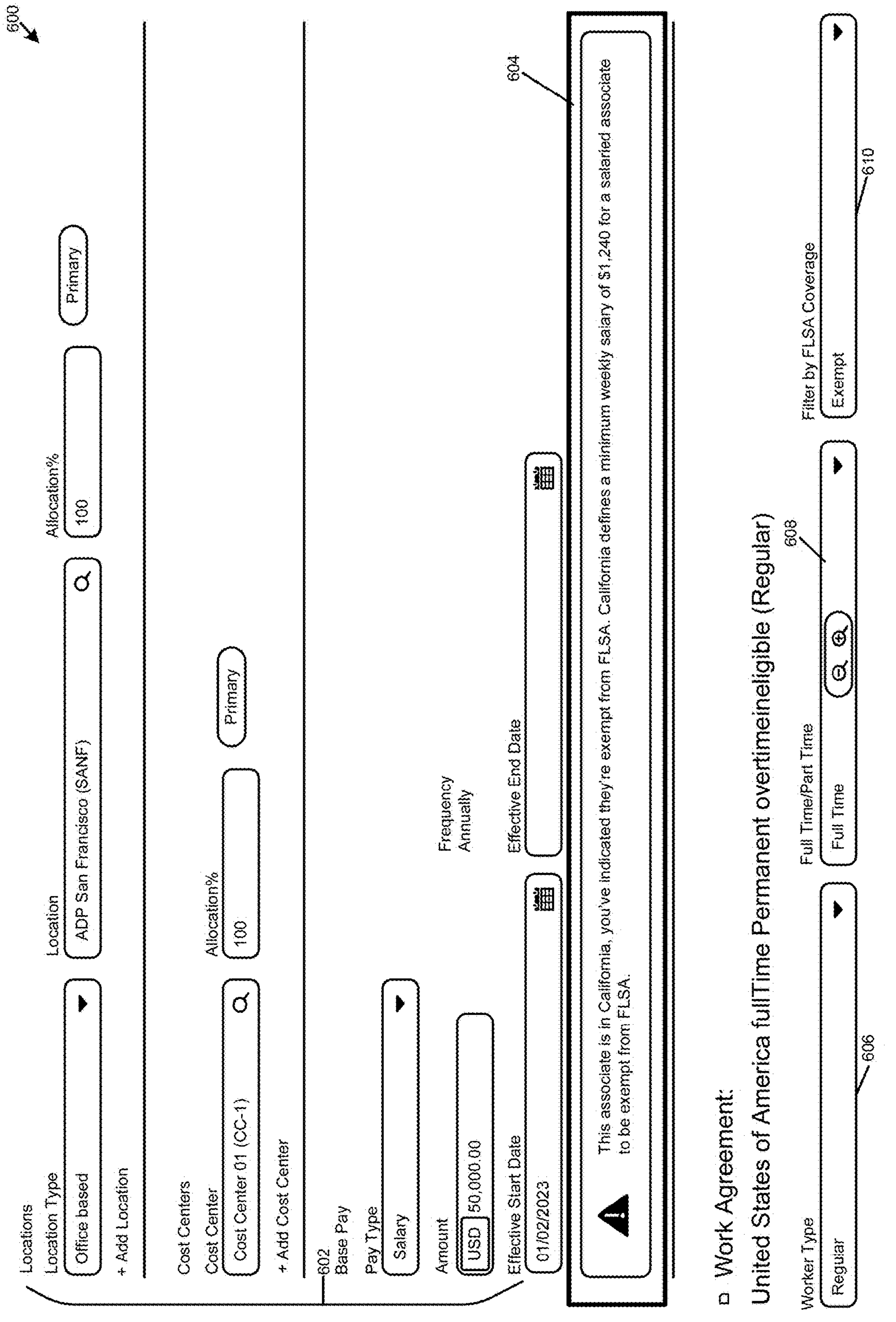

The statutory updates 404 and 406 are shown in more detail in FIG. 5. For example, as shown in FIG. 5, the statutory update 404 is described in more detail. The statutory update 404 can include a title 502 and the date 504 when the statutory update was published. The statutory update 404 can include a summary 506 which includes a brief overview of the statutory update 404. The statutory update 404 can include a bookmark or flag button 511 which allows the user to save the statutory update 404. The statutory update 404 can include an interactive button 508 which the user can interact with (e.g., click, select, etc.) to learn more information about the statutory update 404.

The user interface 400 can also include a user interface portion 408 which gives a user the ability to start a conversation regarding the statutory updates. By interacting with the user interface portion 408, the website can be navigated to a message or community board where the statutory updates are discussed. The user interface 400 can also include a user interface portion 410 which gives the user the ability to get help regarding the statutory updates 406 and 404. The user can search the statutory updates at search portal 402.

The computing device 105 can be configured to determine a time limit based on the detected update to the operational constraint and provide an alert notification indicating the action and set the time limit based on the detected update to automatically execute the action if an override of the action is not received within the time limit. For example, employees for the entity 175 can claim W4 exempt status from Federal Withholding tax. This exemption expires the end of every year unless the employee files a new form claiming exempt for the new year. If a new form is not filed, the computing device 105 should notify and update the employee Federal filing status to Single Zero, per IRS guidelines if an override of the action is not received within a certain time limit. The time limit can determined based on the severity of a penalty associated with not complying with the detected update. The time limit can be associated with the fiscal year. The computing device 105 can provide the alert notification indicating the action by generating a deeplink which directs a site providing details regarding the one or more legislative documents. For example, as shown in FIG. 5, the computing device 105 can provide a deeplink to a user. A deeplink is a hyperlink that links to specific portion of a website particularly related to subject the deeplink was generated to provide information about. For example, if the deeplink was generated to highlight a specific portion of a legislative website, the deeplink would take the user to the specific portion as opposed to just taking the user to the legislative website as a whole. The deeplink can highlight the compliance item providing a user with quick access to the direct PDF or site with the relevant information. The computing device 105 can render the compliance item in an inline frame ("iFrame"). The alert notification can include a push notification to a user device.

At step 304, the computing device 105 can receive data corresponding to operations executed by the entity 175 from the payroll system 170. For example, the computing device 105 can receive payroll information regarding payroll operations of the entity 175. The payroll information can include, but is not limited to the location of one or more employees, a pay type (e.g., salary, hourly, contract, etc.) and pay amount for one or more employees, a start date for one or more employees, an end date for one or more employees, an employee type, a time status (e.g., full-time, part-time, etc.) of one or more employees, and any employee policies (e.g., paid family leave, sick leave, etc.) which can be associated with the employee. As another example, the computing device 105 can receive tax information regarding tax operation of the entity 175. The tax information can include, but is not limited to, tax withholdings, a tax exempt status, etc. As another example, an entity can implement a retirement contribution operation which facilitates retirement contributions by one or more employees associated with the entity 175. At step 304, the computing device 105 can receive retirement contribution information. As another example, an entity can implement a scheduling operation which facilitates generating a schedule for one or more employees of the entity 175 in compliance with any relevant rules and regulations. At step 304, the computing device 105 can receive scheduling information.

At step 306, the computing device 105 can determine, using a machine learning model, an incompatibility between an operation of the entity and the update to the operational constraint determined at step 304. Specifically, the computing device 105 can execute the compatibility model 180 which includes statutory updates, effective dates for the statutory updates, and data regarding the operation of the entity 175. The compatibility model 180 compares the statutory updates and their respective effective dates to determine any incompatibilities between the current operation of the entity 175 and the updated operational constraints determined at step 304. The compatibility model 180 can be trained with machine learning on historical operational data for the entity 175. The computing device 105 can automatically detect, determine, or otherwise identify incompatibilities or out of compliance conditions to address, and present the incompatibilities or out of compliance conditions to a user along with relevant information that can facilitate addressing the incompatibility (e.g., scope of impact, effective date, possible fines or consequences for not complying, etc.). For example, an entity 175 can perform rate overrides on bonus payments (e.g., supplemental wages, during payroll operations. In such a case, the computing device 105 can determine any incompatibilities between the payroll operations and any statutory regulations relevant to supplemental wages using machine learning. Further, the computing device 105 can surface recommendations on the appropriate supplemental tax withholding that should apply to these types of supplemental wage payments in the specific jurisdiction it is being paid, such as bonuses. For example, the computing device 105 can provide an alert that indicates the compatible or appropriate amount of withholding, an entity specific policy update that can address or resolve the incompatibility, an impact of overriding and potential exposure to help the entity to make compliant informed decisions.

At step 308, the computing device 105 can select an action to address the incompatibility. The computing device 105 can select an action to update at least one of a payroll operation, a tax operation, a retirement contribution operation, and/or a scheduling operation implemented by the entity 175. For example, the computing device can update the tax operation of the entity to implement any tax rate changes, new jurisdiction tax requirements, new taxable wage bases, new tax reporting requirements based on effective date, new pay statement requirements based on jurisdiction, and/or new and temporary government programs which can offer tax relief (e.g., Covid Tax relief programs, natural disaster tax relief programs, etc.).

At step 310, the computing device 105 can automatically execute the action selected at step 308 to modify the operation of the entity to satisfy the update to the operational constraint. Automatically executing the action to implement changes decreases the latency within the computing device 105. The computing device 105 can execute an action to update the operation for the entity by automatically implementing an action within the entity 175 to ensure compliance with the statutory updates. For example, the computing device 105 can interface with the backend payroll system 170 to automatically implement a salary at or above the legal minimum wage after determining an updated statutory minimum wage. The action can include at least one of automatically updating a payroll policy. For example, a statutory update to the minimum wage would automatically update the payroll rate of affected workers and provide a basis of validation to alert the user if payroll inputs violate the statutory requirements so they can make any necessary adjustments and ensure compliance. The actions can include updating a leave policy. For example, a statutory update to paid leave can be implemented in a state jurisdiction which revised its policy. Such an update can be automatically implemented. The actions can include updating a tax policy. For example, a statutory update to a new tax rate can be implemented in a state jurisdiction on a given effective date. Once the effective date is reached, the computing device 105 would automatically update payroll operations implemented by the payroll system 170 to compute the taxes withheld based on the new rate.

In some cases, the computing device 105 can update the operation for the entity 175 by providing a point of entry notification to a user through a user interface. The point of entry notification can summarize the legal conflict between the current operation the entity 175 and what actions a user can take to overcome the legal conflict. The point of entry notification is described in more detail with regard to FIG. 6. For example, referring now to FIG. 6, a user interface 600 showing the front-end system for setting a salary and Fair Labor Standards Act (FLSA) coverage status for an employee is shown, according to an example embodiment. The user interface 600 can include payroll information 602 which describes the salary and location of an employee. A user can attempt to make the employee exempt from FLSA coverage at 610. However, as shown by the payroll information 602, the employee only has a salary of 50,000 annually which is below the legal requirement for residents of California. In this example, the computing device 105 will display a point of entry notification 604 which tells the user that the employee cannot be exempt from FLSA coverage.

Figure 7:
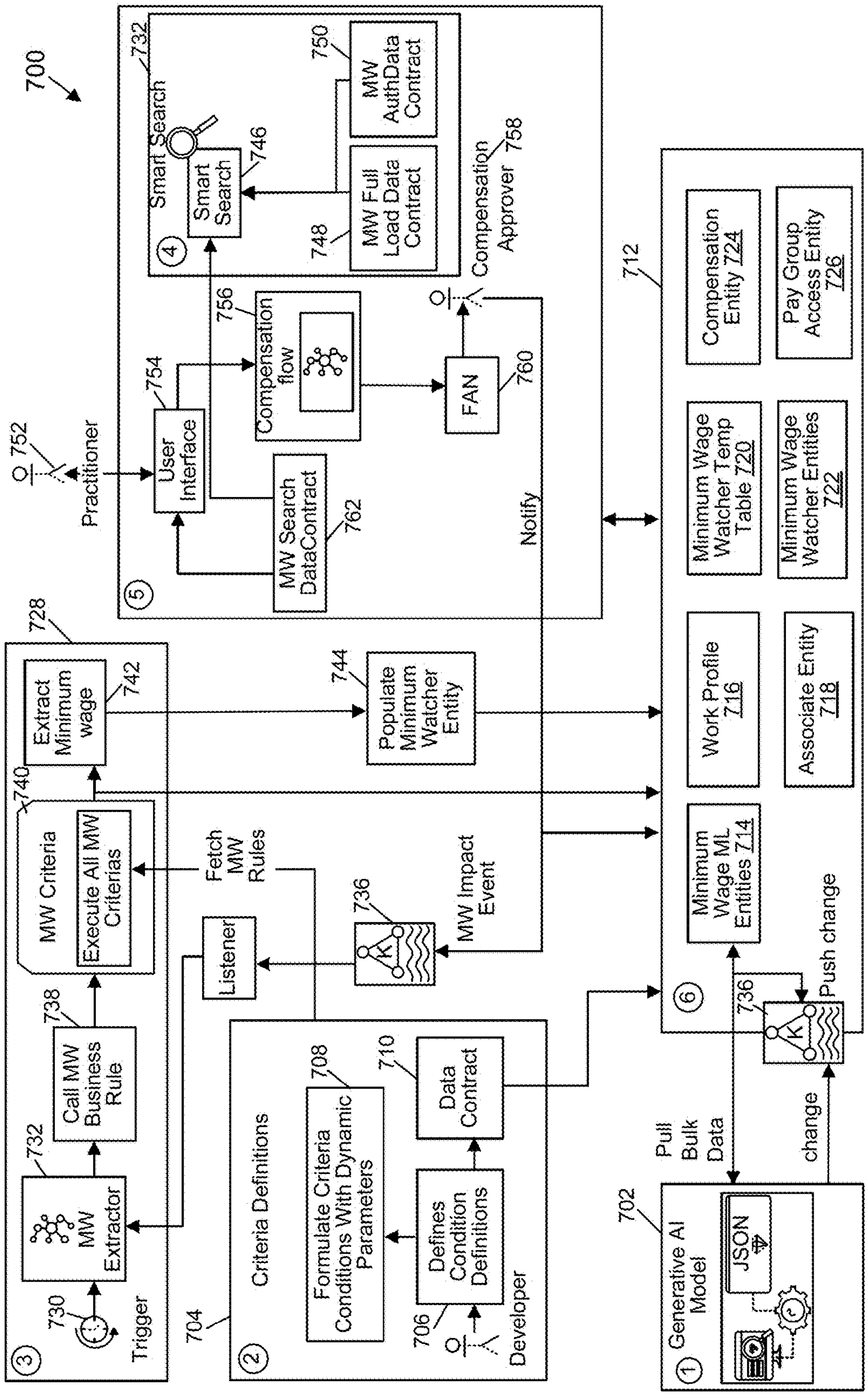
FIG. 7 shows an exemplary generative AI computing system for implementing operation modification to address workflow incompatibility, in accordance with aspects of the present disclosure.

Referring now to FIG. 7, an exemplary generative AI computing system 700 for implementing operation modification to address workflow incompatibility is shown, according to an example embodiment. The generative AI computing system 700 can be a data processing system including one or more processors which are coupled with memory. The generative AI computing system 700 can be used to implement and ensure compliance with minimum wage statutory guidelines. The generative AI system includes 6 process steps including: 1) web scrapping of minimum wage related content, 2) defining conditions, definitions, and criteria for minimum wage, 3) extracting employees under minimum wage, 4) providing data contracts for smart search, 5) populating data for minimum wage in user interface, and 6) absorbing changes at the source which impacts minimum wage.

The first process step is implemented with the generative AI model 702. The generative AI model 702 is configured to use one or more web scrapping techniques to extract minimum wage related data and provide an answer to a received prompt based on the data. The minimum wage related content can be scrapped from web sources related to minimum wage statutory laws such as governmental or statutory websites. In other embodiments, the minimum wage related content can be scrapped from employer documents related to minimum wage for employees. The prompt received may ask the generative AI model to generate a response to a compliance questions (e.g., What is the minimum wage for this employee? What is the leave policy for this employee? etc.)

The generative AI model 702 can work in in two stages to generate a response to the prompt received. In the first stage, the generative AI model 702 evaluates each of the documents gathered through web scrapping to group documents that are similar to each other together. For example, documents which describe the minimum wage in a first jurisdiction can be grouped together. The documents which are similar to each other can be stored in a vector database which describes the similarity of each of the documents using a cosine similarity value. In the second stage, the generative AI model 702 receives a prompt from a user and generates an answer to the prompt of the user based on the grouped documents in the vector database. Specifically, the generative AI model 702 uses the cosine similarity values assigned to each of the grouped documents to determine whether they are relevant to the prompt. Once the generative AI model 702 has surfaced the relevant documents, the generative AI model 702 then evaluates the documents to provide an answer to the users prompts. By using the generative AI model in the two stages described above, the generative AI model is able to generate responses to prompts ten times faster than conventional systems.

A user can provide feedback on the answer received in response to the prompt they provided to the generative AI model 702. The feedback can be used to further train the generative AI model 702 to provide better answers to future prompts which are similar.

The second process step is implemented with the criteria definitions 704. The criteria definitions can be created based on information received from a developer. Specifically, the developer defines condition definitions 706 which can be used to develop criteria for defining rules for generating responses by the generative AI model 702. For example, the condition definitions can describe certain employee designations (e.g., salaried, hourly, full-time, part-time, etc.) and the associated policies for those employees. Some policies can include tax policies, leave and time off policies, wage policies, benefits policies, etc.). The condition definitions can be used to formulate criteria conditions with dynamic parameters 708. Specifically, at 708, the generative AI computing system 700 evaluates each employee and determines specific and custom criteria conditions that apply specifically to them. This evaluation can be done dynamically as parameters associate with the employee change. The DataContract 710 can be a structured query language (SQL) query configured to request and receive data associated with the employees.

The DataContract 710 can receive data from an employee database 712. The employee database 712 can include minimum wage machine learning entities data 714, work profile data 716, associate entity data 718, minimum wage watcher entities data 720, minimum wage watcher temp table 722, compensation entity data 724, and pay group access entity 726. The minimum wage machine learning entities data 714 can include one or more entities used by the generative AI model to determine the minimum wage. The work profile data 716 can include data associated with the work profiles for any employees associated with the compensation entity. The compensation entity data 724 can include data associated with the compensation entity (e.g., employer).

The third process step is implemented with the rule extractor 728. The rule extractor described as an exemplary embodiment in this case is a minimum wage extractor. However, this disclosure is not meant to be limiting. The rule extractor 728 can be applied in a variety of different scenarios to extract and apply different rules to ensure compliance with statutory and organizational policies. The rule extractor 728 can be triggered by trigger 730 to run dynamically at pre-determined intervals (daily, weekly, monthly, etc.). The rule extractor 728 can include a minimum wage extractor 732 which is configured to determine the current minimum wage via the listener 734. The listener 734 is configured to monitor the employee database 712 to determine if a minimum wage impact event 736 has occurred.

The rule extractor 728 can then be configured to call the minimum wage business rule 738 which fetches the minimum wage rules/criteria 740 determined in criteria definitions 704. The generative AI computing system 700 can then execute all the minimum wage criteria to determine an extracted minimum wage 742. The extracted minimum wage 742 can be used to populate the minimum wage watcher entity at 744.

The fourth step in the process is performed by the smart search 746. The smart search 746 can be facilitated by a minimum wage full load DataContract 748 and a minimum wage authentication DataContract 750. The minimum wage full load DataContract 748 and the minimum wage authentication DataContract 750 are SQL data queries which use the data from the minimum wage watcher entities to generate search responses.

In the fifth step in the process, the user interface 754 is populated with minimum wage data as determined above. In some embodiments, a practitioner 752 interacts with the user interface 754 to determine complete a compensation workflow 756. For example, the practitioner 752 can interact with chatbot configured to utilize the generative AI model as described above to determine a minimum wage for an employee and determine if the minimum wage for the employee is in compliance with the relevant statutory and organizational policies. The chatbot can provide guided interactions by notifying the practitioner of any outstanding action items they need to complete. Further, the chatbot can provide point of entry notifications on the user interface 754. In some embodiments, a minimum wage search DataContract 762 is used to gather the data used to populate the user interface 754. After the compensation workflow has been completed, a notification can be provided to a compensation approver that 758 that the compensation for the employee needs to be improved. In some embodiments, the notification can be provided by a fully automated notification (FAN) system 760.

In the sixth step of the process, the data in the employee data is continually monitored and updated. The steps above can repeat as necessary based on any updates.

The example use cases described blow are not meant to be limiting.

Example 1: New Statutory requirement-Washington Cares Act, effective on a pre-determined date, outlines which employers would be required to collect a premium of 0.58% of an employee's gross wages, unless the employee files an exemption. Based on this requirement and the payroll information and tax information for an entity (e.g., registered tax jurisdictions, location of employees, etc.) the computing device can determine whether the entity is conducting operations in Washington. The computing device can determine and display the impact of the new statutory requirement and automatically advise if the entity would be eligible for the new jurisdiction requirement and date & payroll that would be required to take effect on, suggest the policy and provide the entity with the ability to automatically apply to all eligible associates or capture their decision to override/acknowledge with potential liability impact and capture all updates for audit tracking purposes.

Example 2: New Statutory Requirement-New York Labor Code, effective on a pre-determined date, outlines that manual workers must be paid weekly. Based on this information, the computing device can determine any employees for an entity which could be categorized as "manual workers" and automatically update their pay disbursement schedule to disburse weekly.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes can be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

Although an example computing system has been described in FIG. 1, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the disclosed elements and operations without departing from the scope of the present disclosure.

What is claimed is:

1. A system to control operation compatibility via machine learning, comprising:

a data processing system comprising one or more processors, coupled with memory, to:

store, in a vector database, an electronic document that establishes an update to an operational constraint, wherein the vector database groups the electronic document with a subset of a plurality of electronic documents according to similarity metrics;

detect, via natural language processing, the update to the operational constraint established in the electronic document;

receive, from an electronic processing system, data corresponding to operations executed by an entity;

determine, via one or more models trained with machine learning on historical operational data for the entity, an incompatibility between an operation of the entity and the update to the operational constraint;

select, responsive to the determination of the incompatibility made via the one or more models, an action to address the incompatibility;

transmit, to the entity, an alert indicating a time limit to receive an override to the action, wherein the time limit is set based on a severity of non-compliance with the update and the action is to be automatically executed responsive to the override not being received from the entity within the time limit;

determine, based on the detection that the override not being received within the time limit, to automatically execute the action;

transmit, responsive to the determination to automatically execute the action, to the electronic processing system, data to cause the electronic processing system to automatically execute the action to modify the operation of the entity to satisfy the update to the operational constraint;

generate, responsive at least in part to receipt of an input associated with the operation of the entity from a client system, a response to the input, wherein the response is generated based on selectively accessing, using the one or more models, the subset of the plurality of electronic documents that are grouped with the electronic document in the vector database; and transmit, to the client system, data to cause the client system to display the response via a display device.

2. The system of claim 1, comprising the data processing system to: detect the update to the operational constraint using natural language processing; and determine the time limit based on the detected update to the operational constraint.

3. The system of claim 2, wherein the time limit is determined based on the severity of a penalty associated with not complying with the detected update.

4. The system of claim 2, wherein the time limit is associated with a fiscal year.

5. The system of claim 1, comprising:

the data processing system to determine the incompatibility between the updated operational constraint and the operation of the entity using the one or more models.

6. The system of claim 2, comprising:

the data processing system to transmit the alert based on generation of a deeplink which directs to a site providing details regarding one or more legislative documents.

7. The system of claim 2, comprising:

the data processing system to transmit the alert by sending a push notification to a user device.

8. The system of claim 2, wherein the action comprises at least one of automatically updating a payroll policy, automatically updating a leave policy, and automatically updating a tax policy.

9. The system of claim 2, wherein the alert is a point of entry notification.

10. A method for controlling operation compatibility via machine learning, the method comprising:

storing, by one or more processors, coupled with memory, in a vector database, an electronic document that establishes an update to an operational constraint, wherein the vector database groups the electronic document with a subset of a plurality of electronic documents according to similarity metrics;

detecting, by the one or more processors, the update to the operational constraint established in the electronic document;

receiving, by the one or more processors, from an electronic processing system, data corresponding to operations executed by an entity;

determining, by the one or more processors, via one or more models trained with machine learning on historical operational data for the entity, an incompatibility between an operation of the entity and the update to the operational constraint;

selecting, by the one or more processors, responsive to the determination of the incompatibility made via the one or more models, an action to address the incompatibility;

transmitting, by the one or more processors, to the entity, an alert indicating a time limit to receive an override to the action, wherein the time limit is set based on a severity of non-compliance with the update and the action is to be automatically executed responsive to the override not being received from the entity within the time limit;

determining, by the one or more processors, based on the override not being received within the time limit, to automatically execute the action;

transmitting, by the one or more processors, responsive to the determination to automatically execute the action, to the electronic processing system, data to cause the electronic processing system to automatically execute the action to modify the operation of the entity to satisfy the update to the operational constraint;

generating, by the one or more processors, responsive at least in part to receipt of an input associated with the operation of the entity from a client system, a response to the input, wherein the response is generated based on selectively accessing, using the one or more models, the subset of the plurality of electronic documents that are grouped with the electronic document in the vector database; and transmitting, by the one or more processors, to the client system, data to cause the client system to display the response via a display device.

11. The method of claim 10, further comprising:

detecting, by the one or more processors, the update to the operational constraint using natural language processing; and determining, by the one or more processors, the time limit based on the detected update to the operational constraint.

12. The method of claim 11, wherein the time limit is determined based on the severity of a penalty associated with not complying with the detected update.

13. The method of claim 11, wherein the time limit is associated with a fiscal year.

14. The method of claim 11, wherein determining the incompatibility between the updated operational constraint and the operation of the entity comprises using the one or more models.

15. The method of claim 11, wherein transmitting the alert comprises generating a deeplink which directs to a site providing details regarding one or more legislative documents.

16. The method of claim 11, wherein transmitting the alert comprises sending a push notification to a user device.

17. The method of claim 11, wherein the action comprises at least one of automatically updating a payroll policy, automatically updating a leave policy, and automatically updating a tax policy.

18. The method of claim 11, wherein the alert is a point of entry notification.

19. A computer program product for controlling operation compatibility via machine learning, the computer program product comprising a non-transitory computer readable storage medium having program instructions embodied therewith, the program instructions executable by one or more processors to:

store, in a vector database, an electronic document that establishes an update to an operational constraint, wherein the vector database groups the electronic document with a subset of a plurality of electronic documents according to similarity metrics;

detect, via natural language processing, the update to the operational constraint established in the electronic document;

receive, from an electronic processing system, data corresponding to operations executed by an entity;

determine, via one or more models trained with machine learning on historical operational data for the entity, an incompatibility between an operation of the entity and the update to the operational constraint;

select, responsive to the determination of the incompatibility made via the one or more models, an action to address the incompatibility;

transmit, to the entity, an alert indicating a time limit to receive an override to the action, wherein the time limit is set based on a severity of non-compliance with the update and the action is to be automatically executed responsive to the override not being received from the entity within the time limit;

determine, based on the override not being received within the time limit, to automatically execute the action;

transmit, responsive to the determination to automatically execute the action, to the electronic processing system, data to cause the electronic processing system to automatically execute the action to modify the operation of the entity to satisfy the update to the operational constraint;

generate, responsive at least in part to receipt of an input associated with the operation of the entity from a client system, a response to the input, wherein the response is generated based on selectively accessing, using the one or more models, the subset of the plurality of electronic documents that are grouped with the electronic document in the vector database; and transmit, to the client system, data to cause the client system to display the response via a display device.

20. The computer program product of claim 19, wherein the program instructions are further executable by the one or more processors to:

detect the update to the operational constraint using the one or more models; and determine the time limit based on the detected update to the operational constraint.

* * * * *